US006192358B1

(12) United States Patent
Fuh et al.

(10) Patent No.: US 6,192,358 B1
(45) Date of Patent: Feb. 20, 2001

(54) MULTIPLE-STAGE EVALUATION OF USER-DEFINED PREDICATES

(75) Inventors: Gene Y. C. Fuh; Michelle Mei-Chiou Jou; Hsin Pan, all of San Jose; Yun Wang, Saratoga, all of CA (US)

(73) Assignee: Internatioanal Business Machines Corporation, Armonk, NY (US)

( * ) Notice: Under 35 U.S.C. 154(b), the term of this patent shall be extended for 0 days.

(21) Appl. No.: 09/112,301

(22) Filed: Jul. 9, 1998

Related U.S. Application Data (60) Provisional application No. 60/052,180, filed on Jul. 10, 1997.

(51) Int. Cl.[7] ............................................ G06F 17/30
(52) U.S. Cl. ........................................ 707/4; 707/5; 707/2
(58) Field of Search ............................ 707/3, 2, 4, 104, 707/5

(56) References Cited

U.S. PATENT DOCUMENTS

| | | |
|---|---|---|
| 4,531,186 | 7/1985 | Knapman . |
| 4,841,433 | 6/1989 | Hakim et al. . |
| 5,043,872 | 8/1991 | Cheng et al. . |
| 5,299,123 | 3/1994 | Wang et al. . |
| 5,327,543 | 7/1994 | Miura et al. . |
| 5,404,510 | 4/1995 | Smith et al. . |
| 5,423,041 * | 6/1995 | Burke et al. .................... 395/700 |
| 5,428,776 * | 6/1995 | Rothfield .......................... 707/2 |
| 5,454,039 | 9/1995 | Coppersmith et al. . |
| 5,481,700 * | 1/1996 | Thuraisingham ................ 707/104 |
| 5,544,357 | 8/1996 | Huei . |
| 5,546,576 | 8/1996 | Cochrane et al. . |
| 5,553,281 | 9/1996 | Brown et al. . |
| 5,590,325 | 12/1996 | Kolton et al. . |
| 5,604,892 | 2/1997 | Nuttall et al. . |
| 5,608,904 | 3/1997 | Chaudhuri et al. . |
| 5,619,692 | 4/1997 | Malkemus et al. . |

(List continued on next page.)

FOREIGN PATENT DOCUMENTS 0 650 131 A1    4/1995   (EP) .

OTHER PUBLICATIONS

"Heirarchical Data Model for a Relational Database based Geographic Information System", *IBM® Technical Disclosure Bulletin*, 40(30):107–116 (Mar. 1997).

Lynch, C. et al., "Extended User–Defined Indexing with Application to Textual Databases", Proceedings of the 14th VLDB Conference, pp. 306–317 (1988).

Rudolf Bayer, "The Universal B–Tree for Multidimensional Indexing: General Concepts", Worldwide Computing and Its Applications, International Conference, WWCA '97, Tsukuba, Japan, (Mar. 1997).

Faloutsos, C. et al., "Fast Map: A Fast Algorithm for Indexing, Data–Mining and Visualization of Traditional and Multimedia Datasets", Proc. of ACM SIGMOD, pp. 163–174 (May 1995).

Ouksel, M. et al., "Multidimensional B–trees: Analysis of Dynamic Behavior", Dept. of Elec. Eng. and Computer Science, Northwestern Univ., Evanston, Ill., BIT 21, pp. 401–418 (1981).

(List continued on next page.)

*Primary Examiner*—Thomas G. Black
*Assistant Examiner*—Frantz Coby
(74) *Attorney, Agent, or Firm*—Pretty & Schroeder, P.C.

(57) ABSTRACT

A method, apparatus, and article of manufacture for a computer-implemented multiple-stage evaluation of a user-defined predicate. A statement is executed in a database stored on a data storage device connected to a computer. The statement is received containing a user-defined predicate with a user-defined function. Then, multiple-stage evaluation of the user-defined predicate is performed.

24 Claims, 6 Drawing Sheets

U.S. PATENT DOCUMENTS

| | | |
|---|---|---|
| 5,630,125 | 5/1997 | Zellweger . |
| 5,630,127 | 5/1997 | Moore et al. . |
| 5,640,567 * | 6/1997 | Phipps .................................. 395/703 |
| 5,644,770 * | 7/1997 | Burke et al. ........................ 395/710 |
| 5,691,917 * | 11/1997 | Harison ................................ 364/514 |
| 5,721,900 * | 2/1998 | Banning et al. ......................... 707/4 |
| 5,758,146 * | 5/1998 | Schiefer et al. ........................ 707/2 |
| 5,758,337 * | 5/1998 | Hammond ............................... 707/6 |
| 5,765,147 * | 6/1998 | Mattos et al. ............................ 707/4 |
| 5,806,061 * | 9/1998 | Chaudhuri et al. ..................... 707/3 |
| 5,826,076 * | 10/1998 | Bradley et al. ......................... 704/4 |
| 5,864,841 * | 1/1999 | Agrawal et al. ........................ 707/2 |

OTHER PUBLICATIONS

Klaus, F. et al., "Flexible, Runtime Efficient Fector–Radix Algorithms For Multidimensional Fast Fourier Transform", SPIE, vol. 2247, Sensors and Control for Automation, pp. 216–226 (1994).

Sang, K.S. et al., "Applicability of genetic algorithms to optimal evaluation of path predicates in object–oriented queries", Information Processing Letters, vol. 58, No. 3, pp. 123–128 (abstract), (May 1996).

Byungwook, K. et al., "A new indexing scheme supporting multi–attribute database applications: MAX", Journal of Systems Architecture, vol. 42, No. 2, pp. 144–162 (abstract), (Sep. 1996).

Silberschatz, A. et al., "Managing Class Types", SPI Database of Software Technologies, 6 pages, (May 1977).

Scheuermann, P. et al., "Multidimensional B–Trees For Associative Searching In Database Systems", Inform. Systems, vol. 7, No. 2, pp. 123–137 (1982).

* cited by examiner

MULTIPLE-STAGE EVALUATION OF USER-DEFINED PREDICATES

PROVISIONAL APPLICATION

This application claims the benefit of U.S. Provisional Application Ser. No. 60/052,180, entitled "User Defined Search in Relational Database Management Systems," filed on Jul. 10, 1997, by Gene Y. C. Fuh et al., which is incorporated by reference herein.

CROSS-REFERENCE TO RELATED APPLICATIONS

This application is related to the following copending and commonly-assigned patent applications:

Application Ser. No. 09/113,976, entitled "User-Defined Search in Relational Database Management Systems," filed on same date herewith, by Gene Y. C. Fuh, et al.;

Application Ser. No. 09/112,723, entitled "Supporting Database Indexes Based on a Generalized B-Tree Index," filed on same date herewith, by Stefan Dessloch, et al.;

Application Ser. No. 09/112,307, entitled "A Generalized Model for the Exploitation of Database Indexes," filed on same date herewith, by Gene Y. C. Fuh, et al.;

Application Ser. No. 09/113,802, entitled "Run-time Support for User-Defined Index Ranges and Index Filters," filed on same date herewith, by Michelle Jou, et al.;

Application Ser. No. 09/112,302, entitled "A Fully Integrated Architecture For User-Defined Search," filed on same date herewith, by Gene Y.C. Fuh, et al.;

Application Ser. No. 08/786,605, entitled "A Database Management System, Method and Program for Supporting the Mutation of a Composite Object Without Read/Write and Write/Write Conflicts," filed on Jan. 21, 1997, by Linda G. DeMichiel, et al.; and Application Ser. No. 08/914,394, entitled "An Optimal Storage Mechanism for Persistent Objects in DBMS," filed on Aug. 19, 1997, by Gene Y. C. Fuh, et al.;

all of which are incorporated by reference herein.

BACKGROUND OF THE INVENTION

1. Field of the Invention

This invention relates in general to computer-implemented database systems, and, in particular, to multiple-stage evaluation of user-defined predicates.

2. Description of Related Art

Databases are computerized information storage and retrieval systems. A Relational Database Management System (RDBMS) is a database management system (DBMS) which uses relational techniques for storing and retrieving data. Relational databases are organized into tables which consist of rows and columns of data. The rows are formally called tuples or records. A database will typically have many tables and each table will typically have multiple tuples and multiple columns. The tables are typically stored on direct access storage devices (DASD), such as magnetic or optical disk drives for semi-permanent storage.

Many traditional business transaction processing is done using a RDBMS. Since the inclusion of RDBMSs in business, user-defined data types and user-defined functions have been brought into RDBMSs to enrich the data modeling and data processing power. User-defined data based on the user-defined data types may include audio, video, image, text, spatial data (e.g., shape, point, line, polygon, etc.), time series data, OLE documents, Java objects, C++ objects, etc.

In conventional systems, user-defined functions may be used within SQL statements. However, when a function is within an SQL statement, if a table has "n" records, then the function is executed "n" times, which is inefficient. Additionally, conventional systems cannot process user-defined functions within predicates of a SQL statement (e.g., within a WHERE clause).

Therefore, there is a need in the art for improved evaluation of user-defined predicates.

SUMMARY OF THE INVENTION

To overcome the limitations in the prior art described above, and to overcome other limitations that will become apparent upon reading and understanding the present specification, the present invention discloses a method, apparatus, and article of manufacture for a computer-implemented multiple-stage evaluation of a user-defined predicate technique.

In accordance with the present invention, a statement is executed in a database stored on a data storage device connected to a computer. The statement is received containing a user-defined predicate with a user-defined function. Then, multiple-stage evaluation of the user-defined predicate is performed.

An object of the invention is to enable the use of user-defined predicates in SQL statements. Another object of the invention is to provide multiple-stage evaluation of user defined predicates.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and which is shown by way of illustration a specific embodiment in which the invention may be practiced. It is to be understood that other embodiments may be utilized as structural changes may be made without departing from the scope of the present invention.

Hardware Environment

Figure 1:
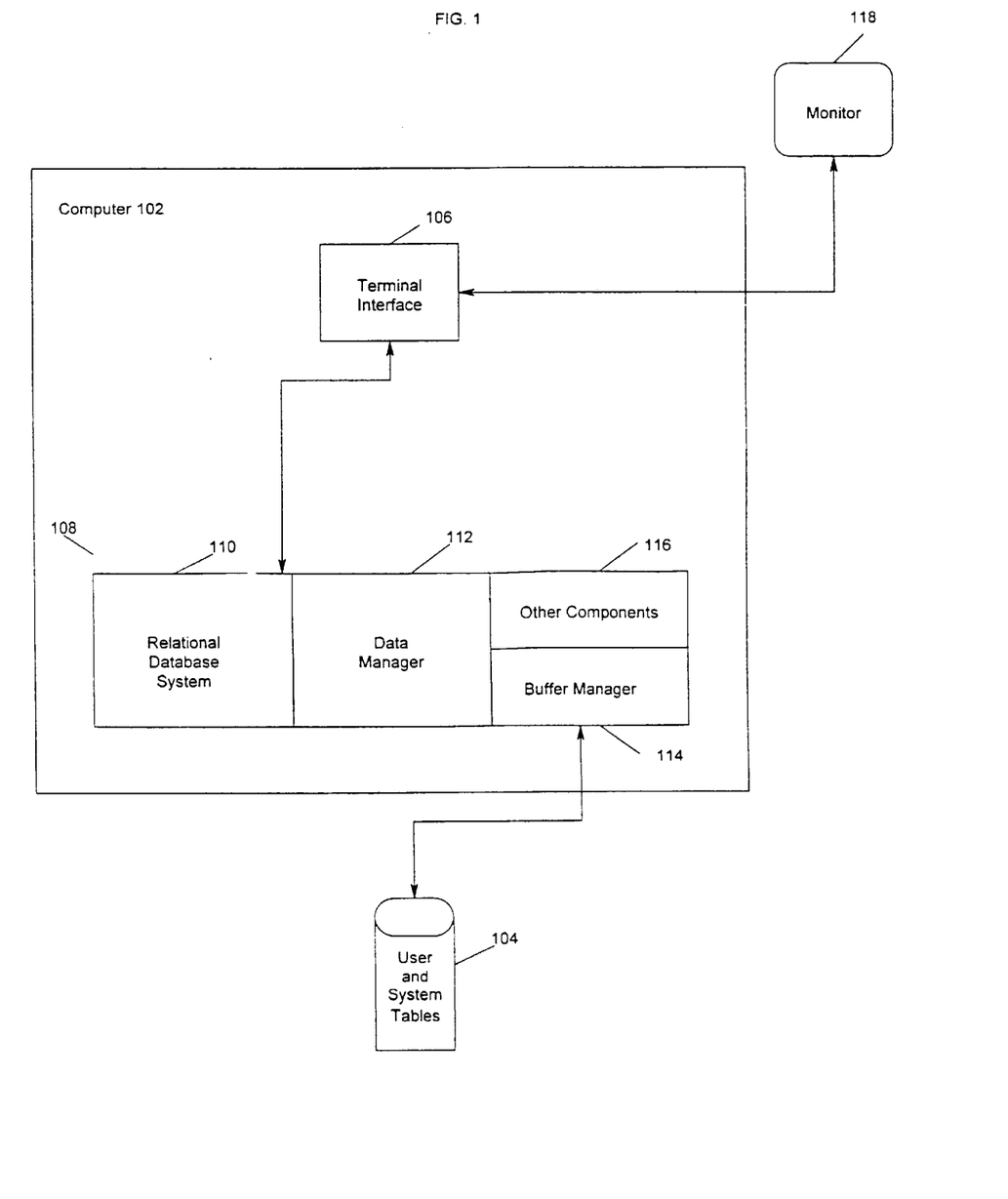
FIG. 1 illustrates an exemplary computer hardware environment that could be used in accordance with the present invention.

FIG. 1 illustrates an exemplary computer hardware environment that could be used in accordance with the present invention. In the exemplary environment, a computer system 102 is comprised of one or more processors connected to one or more data storage devices 104, such as a fixed or hard disk drive, a floppy disk drive, a CDROM drive, a tape drive, or other device, that store one or more relational databases.

Operators of the computer system 102 use a standard operator interface 106, such as IMS/DB/DC®, CICS®, TSO®, OS/390®, ODBC® or other similar interface, to transmit electrical signals to and from the computer system 102 that represent commands for performing various search and retrieval functions, termed queries, against the databases. In the present invention, these queries conform to the Structured Query Language (SQL) standard, and invoke functions performed by Relational DataBase Management System (RDBMS) software.

The SQL interface has evolved into a standard language for RDBMS software and has been adopted as such by both the American National Standards Institute (ANSI) and the International Standards Organization (ISO). The SQL interface allows users to formulate relational operations on the tables either interactively, in batch files, or embedded in host languages, such as C and COBOL. SQL allows the user to manipulate the data.

In the preferred embodiment of the present invention, the RDBMS software comprises the DB2® product offered by IBM for the AIX® operating system. Those skilled in the art will recognize, however, that the present invention has application to any RDBMS software, whether or not the RDBMS software uses SQL.

At the center of the DB2® system is the Database Services module 108. The Database Services module 108 contains several submodules, including the Relational Database System (RDS) 110, the Data Manager 112, the Buffer Manager 114, and other components 116 such as an SQL compiler/interpreter. These submodules support the functions of the SQL language, i.e. definition, access control, interpretation, compilation, database retrieval, and update of user and system data.

The present invention is generally implemented using SQL statements executed under the control of the Database Services module 108. The Database Services module 108 retrieves or receives the SQL statements, wherein the SQL statements are generally stored in a text file on the data storage devices 104 or are interactively entered into the computer system 102 by an operator sitting at a monitor 118 via operator interface 106. The Database Services module 108 then derives or synthesizes instructions from the SQL statements for execution by the computer system 102.

Generally, the RDBMS software, the SQL statements, and the instructions derived therefrom, are all tangibly embodied in a computer-readable medium, e.g. one or more of the data storage devices 104. Moreover, the RDBMS software, the SQL statements, and the instructions derived therefrom, are all comprised of instructions which, when read and executed by the computer system 102, causes the computer system 102 to perform the steps necessary to implement and/or use the present invention. Under control of an operating system, the RDBMS software, the SQL statements, and the instructions derived therefrom, may be loaded from the data storage devices 104 into a memory of the computer system 102 for use during actual operations.

Thus, the present invention may be implemented as a method, apparatus, or article of manufacture using standard programming and/or engineering techniques to produce software, firmware, hardware, or any combination thereof. The term "article of manufacture" (or alternatively, "computer program product") as used herein is intended to encompass a computer program accessible from any computer-readable device, carrier, or media. Of course, those skilled in the art will recognize many modifications may be made to this configuration without departing from the scope of the present invention.

Those skilled in the art will recognize that the exemplary environment illustrated in FIG. 1 is not intended to limit the present invention. Indeed, those skilled in the art will recognize that other alternative hardware environments may be used without departing from the scope of the present invention.

Figure 2:
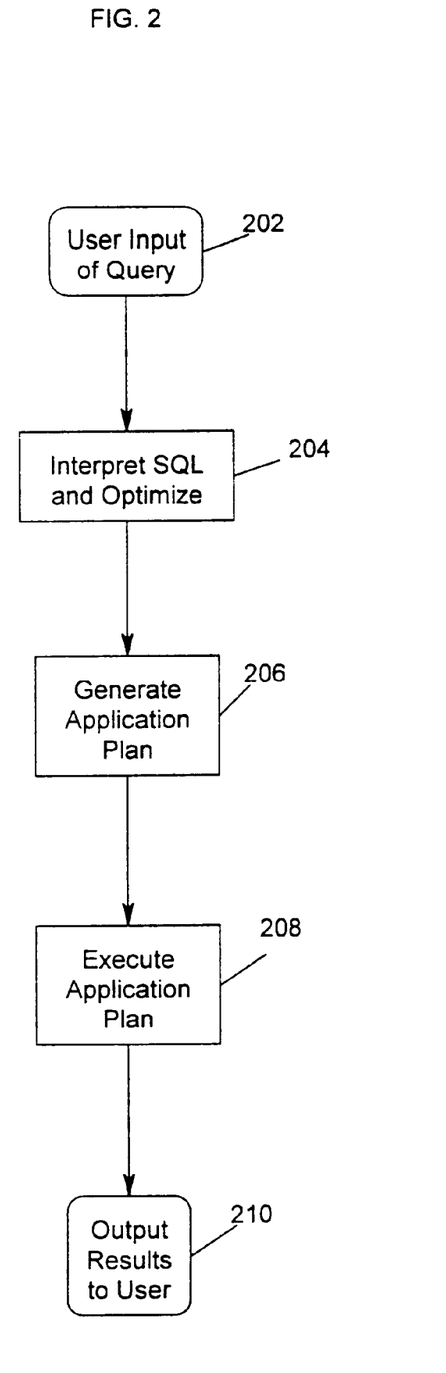
FIG. 2 is a flowchart illustrating the steps necessary for the interpretation and execution of SQL statements in an interactive environment according to the present invention.

FIG. 2 is a flowchart illustrating the steps necessary for the interpretation and execution of SQL statements in an interactive environment according to the present invention. Block 202 represents the input of SQL statements into the computer system 102 from the user. Block 204 represents the step of compiling or interpreting the SQL statements. An optimization function within block 204 may optimize the SQL. Block 206 represents the step of generating a compiled set of run-time structures called an application plan from the compiled SQL statements. Generally, the SQL statements received as input from the user specify only the data that the user wants, but not how to get to it. This step considers both the available access paths (indexes, sequential reads, etc.) and system held statistics on the data to be accessed (the size of the table, the number of distinct values in a particular column, etc.), to choose what it considers to be the most efficient access path for the query. Block 208 represents the execution of the application plan, and block 210 represents the output of the results of the application plan to the user.

Figure 3:
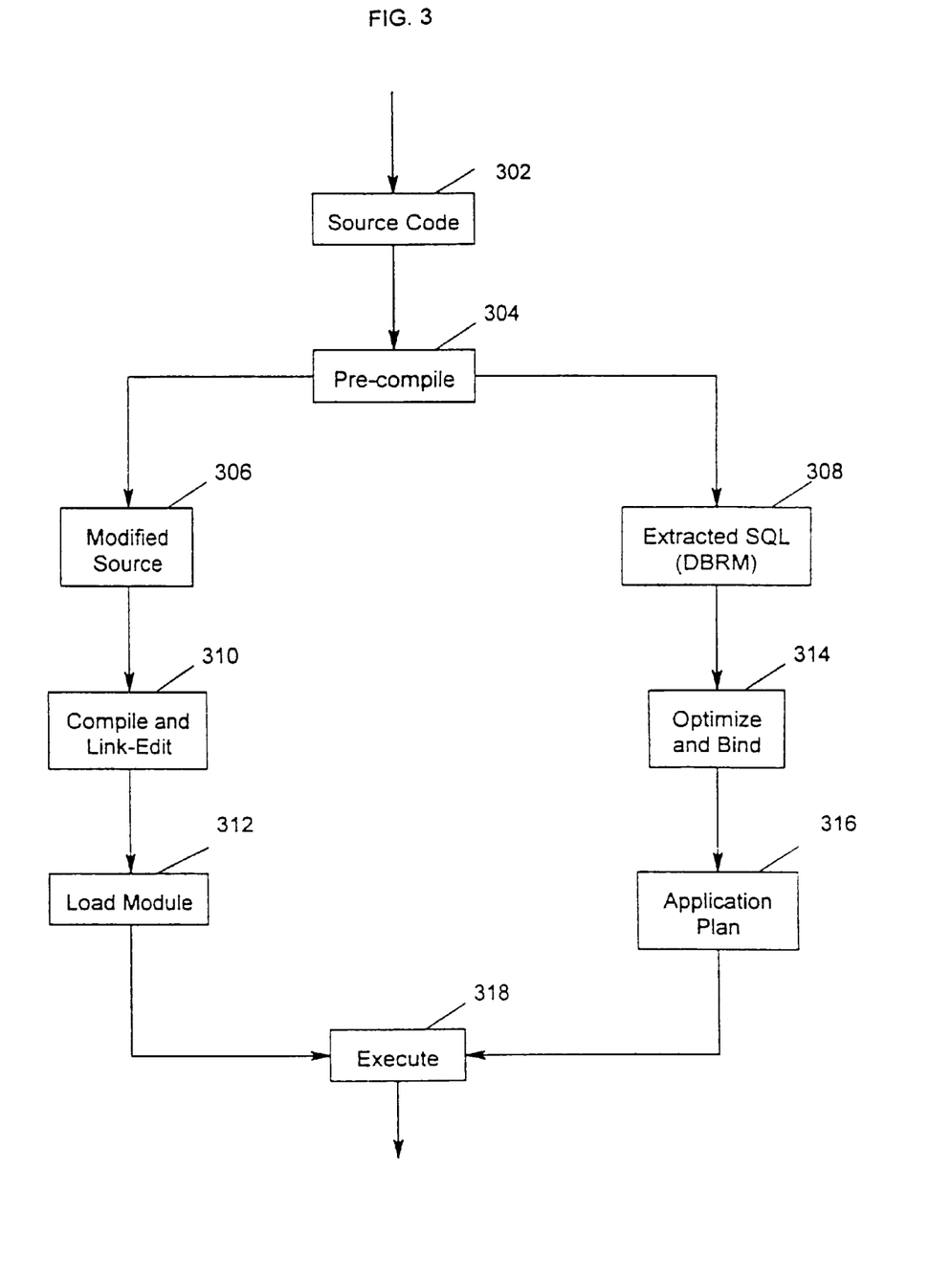
FIG. 3 is a flowchart illustrating the steps necessary for the interpretation and execution of SQL statements embedded in source code according to the present invention.

FIG. 3 is a flowchart illustrating the steps necessary for the interpretation and execution of SQL statements embedded in source code according to the present invention. Block 302 represents program source code containing a host language (such as COBOL or C) and embedded SQL statements. The program source code is then input to a pre-compile step 304. There are two outputs from the pre-compile step 304: a modified source module 306 and a Database Request Module (DBRM) 308. The modified source module 306 contains host language calls to DB2, which the pre-compile step 304 inserts in place of SQL statements. The DBRM 308 consists of the SQL statements from the program source code 302. A compile and link-edit step 310 uses the modified source module 306 to produce a load module 312, while an optimize and bind step 314 uses the DBRM 308 to produce a compiled set of run-time structures for the application plan 316. As indicated above in conjunction with FIG. 2, the SQL statements from the program source code 302 specify only the data that the user wants, but not how to get to it. The optimize and bind step 314 may reorder the SQL query in a manner described in more detail later in this specification. Thereafter, the optimize and bind step 314 considers both the available access paths (indexes, sequential reads, etc.) and system held statistics on the data to be accessed (the size of the table, the number of distinct values in a particular column, etc.), to choose what it considers to be the most efficient access path for the query. The load module 312 and application plan 316 are then executed together at step 318.

The Extended DBMS Architecture for User-Defined Search

Figure 4:
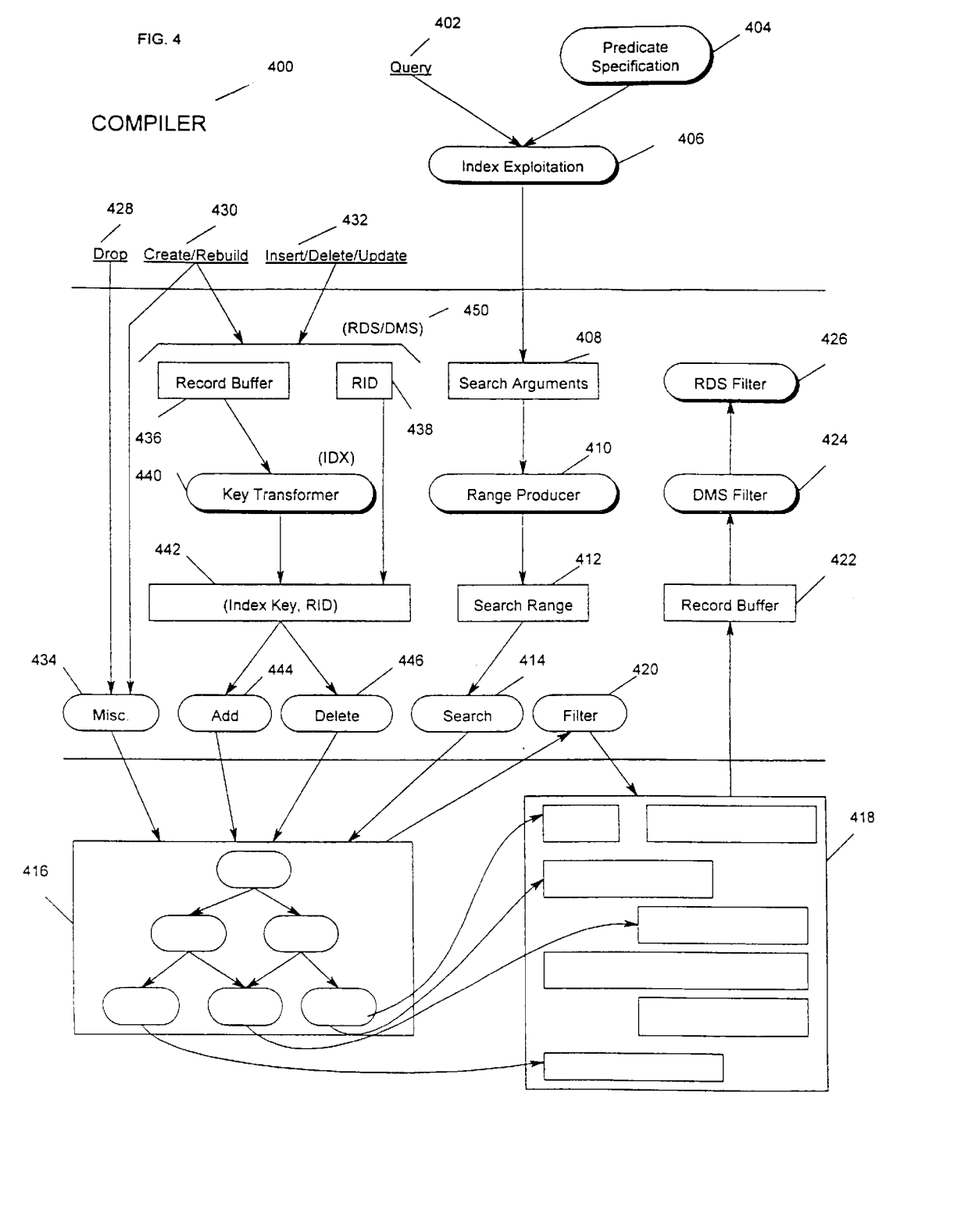
FIG. 4 illustrates a compiler of the present invention.

FIG. 4 illustrates a compiler 400 of the present invention, which performs steps 204 and 206, discussed above. The compiler 400 of the present invention contains the following "extended" modules: Predicate Specification 404 and Index Exploitation 406. The run-time 450 of the present invention contains the following "extended" modules: Range Producer 410, DMS Filter 424, RDS Filter 426, and Key Transformer 440. The "extended" modules have been modified to provide the capability for pushing user-defined types, index maintenance and index exploitation, and user-defined functions and predicates inside the database.

The Predicate Specification module 404 has been extended to handle user-defined predicates. The Index Exploitation module 406 has been modified to exploit user-defined indexes and provide more sophisticated pattern matching (e.g., recognizes "salary+bonus").

Additionally, the Predicate Specification module 404, the Index Exploitation module 406, and the DMS Filter module 424 work together to provide a technique to evaluate user-defined predicates using a three-stage technique. In the first stage, an index is applied to retrieve a subset of records using the following modules: Search Arguments 408, Range Producer 410, Search Range 412, Search 414, and Filter 420. For the records retrieved, in the second stage, an approximation of the original predicate is evaluated by applying a user-defined "approximation" function to obtain a smaller subset of records, which occurs in the DMS Filter module. In the third stage, the predicate itself is evaluated to determine whether the smaller subset of records satisfies the original predicate.

The Range Producer module 410 has been extended to handle user-defined ranges, and, in particular, to determine ranges for predicates with user-defined functions and user-defined types. The DMS Filter module 424 and the RDS Filter module 426 have been extended to handle user-defined functions for filtering data.

To process a query 402, the compiler 400 receives the query 402. The query 402 and the predicate specification from the Predicate Specification module 404 are submitted to the Index Exploitation module 406. The Index Exploitation module 406 performs some processing to exploit indexes. At run-time, the Search Arguments module 408 evaluates the search argument that will be used by the Range Producer module 410 to produce search ranges. The Range Producer module 410 will generate search ranges based on user-defined functions. The Search Range module 412 will generate final search ranges. The Search module 414 will perform a search using the B-Tree 416 to obtain the record identifier (ID) for data stored in the data storage device 418. The retrieved index key is submitted to the Filter module 420, which eliminates non-relevant records. Data is then fetched into the Record Buffer module 422 for storage. The DMS Filter module 424 and the RDS Filter module 426 perform final filtering.

The Key Transformer module 440 has been modified to enable users to provide user-defined functions for processing inputs to produce a set of index keys. The userdefined functions can be scalar functions or table functions. A scalar function generates multiple key parts to be concatenated into an index key. A table function generates multiple sets of key parts, each of which is to be concatenated into an index key. Additionally, the input to the Key Transformer module 440 can include multiple values (e.g., values from multiple columns or multiple attributes of a structured type), and the user-defined functions can produce one or more index keys.

The compiler 400 can process various statements, including a Drop 428, Create/Rebuild 430, or Insert/Delete/Update 432 statements. A Drop statement 428 may be handled by Miscellaneous modules 434 that work with the B-Tree 416 to drop data.

An Insert/Delete/Update statement produce record data in the Record Buffer module 436 and the RID module 438. The data in the Record Buffer module 436 is submitted to the Key Transformer module 440, which identifies key sources in the records it receives. Key targets from the Key Transformer module 440 and record identifiers from the RID module 438 are used by the Index Key/RID module 442 to generate an index entry for the underlying record. Then, the information is passed to the appropriate module for processing, for example, an Add module 444 or a Delete module 446.

The compiler 400 will process a Create/Rebuild statement 430 in the manner of the processing a Drop statement 428 when data is not in the table or an Insert/Delete/Update statement 432 when data is in the table.

Multiple-Stage Evaluation Of User-Defined Predicates

The present invention provides a multiple-stage evaluation system that enables the users to include user-defined predicates in a SQL statement. The multiple-stage evaluation system first identifies the stages involved in the evaluation by identifying the combination of stages with the optimal overall filter factor ratio for the combination and the evaluation cost of that combination. With these classifications, the present invention can identify feasible stages with significant performance improvement.

In one embodiment of the present invention, a mathematical abstract model is proposed to describe the steps of classification as well as performance analysis. In the following discussion, the abstract model is used for three stages for illustration only, however, the abstract model can be generalized for multiple-stage evaluation with any number of stages.

The present invention further provides a technique to evaluate the user-defined predicates using a three-stage technique. In the first stage, an index is applied to retrieve a subset of records, within the Index Exploitation module. For the records retrieved, in the second stage, an approximation of the original predicate is evaluated by applying a user-defined "approximation" function to obtain a smaller subset of records, which occurs in the DMS Filter module. In the third stage, the predicate itself is evaluated to determine whether the smaller subset of records satisfies the original predicate. If the predicate is satisfied, the process is complete, otherwise, the present invention continues to evaluate the predicate using the multiple stages.

In conventional systems, external C functions or SQL functions may be used within predicates. However, the evaluation of predicates is to evaluate each user-defined function each time the predicate is evaluated. Additionally, conventional systems fail to provide user-defined predicates.

The following is an example of a user-defined function:
CREATE FUNCTION within (x shape, y shape)
  returns integer
  language c
  not fenced
  external name '/u/fuh/db2sde/gis!within'

The CREATE FUNCTION statement creates a user-defined function named "within", which has the parameters "x" of type shape and "y" of type shape. The userdefined function "within" returns an integer, is written in the C language, is not fenced (i.e., is loaded into the same address space as the query), and has an external name.

The following example is a SQL statement using the user-defined function "within":
SELECT within (loc, circle(100, 100, 10)) FROM customer;

In a conventional system, for the above SELECT within statement, each record in the customer table would be evaluated to determine whether each record fits the criteria required by the user-defined function "within". However, this is an inefficient processing of records, especially when the user-defined function processes structured data. For example, if a database contained structured data for the map of California in a California customers table, and a SELECT statement was selecting customers who resided within a certain circle of radius of San Jose from the table, then the above statement, in a conventional system, would look at each record in the customer table (i.e., each customer in California) and determine whether the customer of each record resides within the required radius of San Jose.

On the other hand, with multiple-stage evaluation of user-defined predicates, if the user-defined function "within" is used in a predicate, the present invention is able to avoid retrieving every record in a table of California customers. For example, the following example illustrates a SQL statement in which a user-defined predicate is used:

SELECT cid, name, addr FROM customer
WHERE within (loc, circle (100, 100, 10))=1;

The above SELECT statement contains a user-defined predicate. In particular, the predicate beginning with the WHERE clause contains the user-defined function "within". Multiple-stage evaluation for the user-defined predicate of the above SELECT statement reduces the number of times the user-defined function "within" is evaluated to improve the efficiency of processing the statement. First, index exploitation is performed to obtain a subset of records using another user-defined index exploitation function. Second, an "approximation" function is evaluated to get another subset of data. The "approximation" function is also provided by the user. One "approximation" function for the above SELECT statement might be a function that selects all of the records whose customers live within a particular square around San Jose, with the square enclosing more than the area included in the circle of radius required by the original predicate, but less than all of California. The square does not provide the exact information that is desired, which is the list of customers living within a particular circle of radius around San Jose, but the square approximates the desired area of search, thereby reducing the number of the records to be reviewed from those of customers that are in California to those of customers that are in the square. Finally, using the subset, each record is evaluated to determine whether it matches the original predicate.

Figure 5:
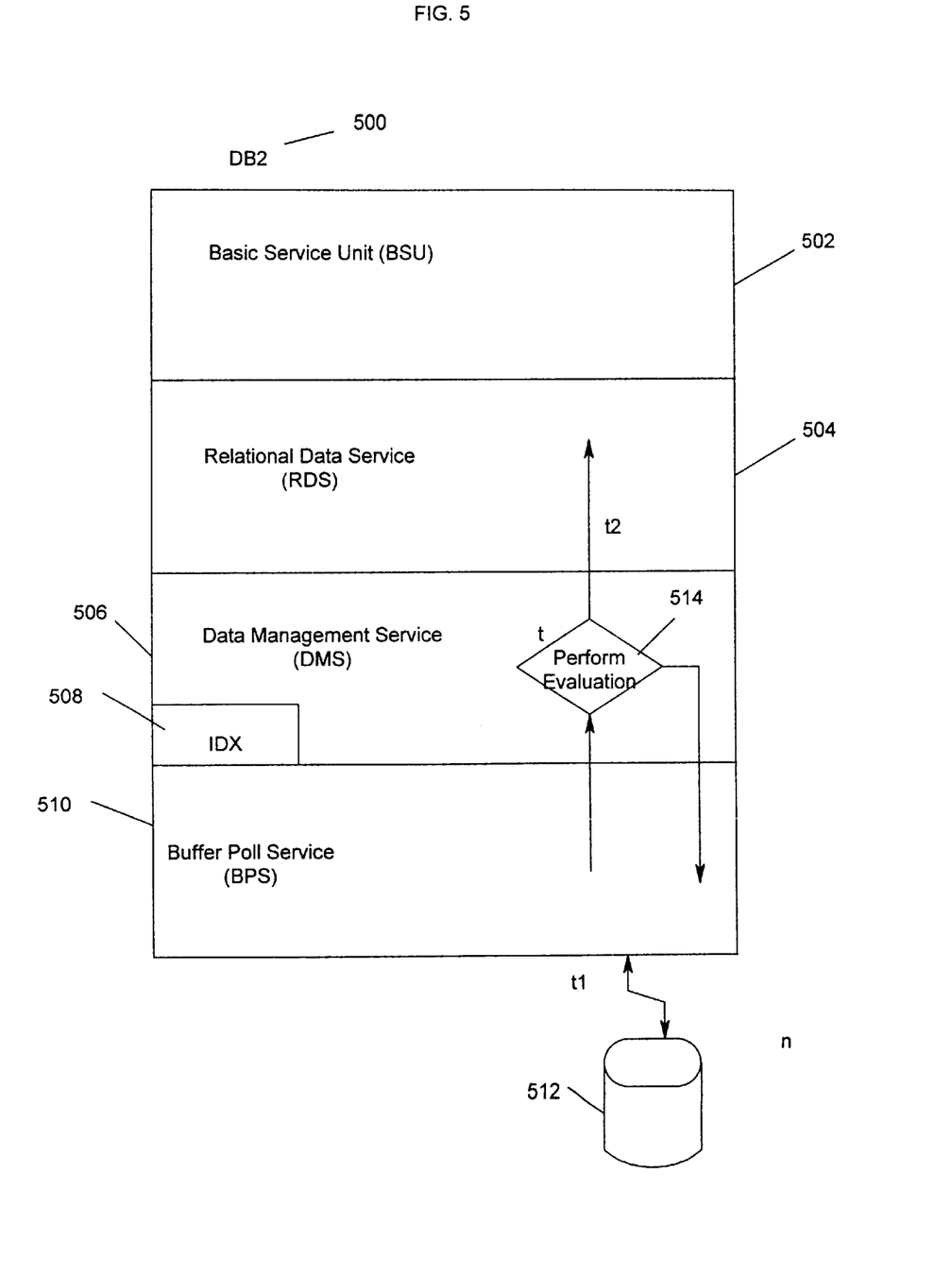
FIG. 5 is a block diagram illustrating a general architecture for a DB2 system.

FIG. 5 is a block diagram illustrating a general architecture for a DB2 system. One embodiment of the architecture of a DB2 system 500 is illustrated. A Basic Service Unit 502 provides basic services for the DB2. A Relational Data Service (RDS) 504, within which resides the RDS Filter 426, processes a SQL statement. A Data Management Service (DMS) 506, within which resides the DMS Filter module 424, evaluates a predicate of a SQL statement. An Index Manager (IDX) 508, within which resides the Index Exploitation module 406, performs index exploitation. A Buffer Poll Service (BPS) stores data in a buffer pool that is retrieved from a database 512 on a data storage device.

With multiple-stage evaluation, for a SQL statement containing a user-defined predicate, index exploitation is performed by the Index Exploitation module 406 to identify a subset of records that should be retrieved from the data storage device 512 for the user-defined predicate. Each identified record is retrieved from the database 512 and stored in the buffer pool in the BPS 510. Each record is passed to the DMS module 424 of the DMS 506. Then, in Block 514, the DMS module 424 performs an approximate evaluation using a user-defined "approximation" function to determine if a record fits the requirements of the user-defined "approximation" function. If the record evaluates to the approximation, then the DMS module 424 passes the record on to the RDS module 426 of the RDS 504, otherwise, the DMS module 424, evaluates the next record. The RDS module 426 evaluates the original predicate for the received record to determine whether the record should be returned in response to the originally received SQL statement.

The following example illustrates use of a sample user-defined predicate:

CREATE FUNCTION within (x shape, y shape)
   returns integer
   language c
   not fenced
   external name 'u/fuh/db2sde/gis!within'
   AS PREDICATE when=1
     FILTER BY mbr Within(x..mbr..xmin..x..mbr..ymin,
       x..mbr..xmax, x..mbr..ymax,
       y.mbr..xmin, y..mbr..ymin,
       y..mbr..xmax, y..mbr..ymax),
     SEARCH BY INDEX EXTENSION grid_extension
       when key(x) use searchFirstBySecond(y),
       when key(y) use searchSecondByFirst(x);

The above CREATE FUNCTION statement creates a user-defined function "within". When the user-defined function "within" is used in a predicate, it is to be filtered by the DMS Filter module 424 with the user-defined function "mbrWithin". The filter function "mbrWithin" indicates that if mbr(object1) is not within mbr(object2), then object1 is not within object2. For example, if a customer's location is not within the approximation area (e.g., a square), then the customer's location is not within the requirements of the original predicate (e.g., a circle that is contained within the square).

Index exploitation is performed by the Index Exploitation module 406, along with other modules, including the Search Arguments module 408, the Range Producer module 410, and the Search Range module 412. These modules perform index exploitation using a user-defined index type specified by the SEARCH BY statement (i.e., grid_extension). In particular, when the key of an index is "x", the searchFirstBySecond(y) user-defined function is used, and when the key of the index is "y", a searchSecondbyFirst(x) user-defined function is used. The index exploitation rule illustrated above has other options also, including a RANGE THROUGH option, such as RANGE THROUGH generate-range( . . . ) or a CHECK WITH option.

The following example illustrates a SQL statement with a user-defined predicate:

SELECT cid, name, addr FROM customer
WHERE within (loc, circle(100, 100, 10))=1

The above WHERE clause contains a user-defined function, which is evaluated in the third stage of the multiple-stage evaluation. For example, if a customer's location is within the approximation area (e.g., a square), the record for that customer is passed to the RDS 504 to determine whether the customer's location is within the circle defined by the user-defined function of the original WHERE predicate.

In the following discussion, an abstract mathematical model is proposed to describe multiple-stage evaluation of user-defined predicates. Then, the model is used to discuss the efficiency of multiple-stage evaluation. The database of FIG. 5 contains a table with "n" records. The time that it takes to transfer data (i.e., move a record) from the database to the buffer pool 510 is "t1". However, with current optimization of data storage I/O, it is very likely that a record that is needed will be in the buffer pool, and so the time "t1" can be ignored for the following calculations. The time that it takes to perform the evaluation 514 is "t", which is the =time to filter out a potential result (e.g., evaluation of a predicate such as within ( . . . )=1). The time that it takes to transfer data (i.e., move a record) from the DMS 506 to the RDS 504 is "t2". Additionally, usually "t1" is greater than "t", which is greater than "t2" (i.e., t1>t>t2). The filter factor of the predicate (i.e., the ratio of potential result) is "f".

The following equation is used to determine the amount of time that it takes to evaluate a user-defined predicate:

$$n*(t1+t)+f*n*t2$$

The time to filter out data is "f*n* t2" because for each of the records "n", it takes time "t2" to transfer data from DMS 506 to RDS 504 with a filter factor of "f". Because optimizations enable most of the required data to be stored in a buffer pool 510, "t1" can be ignored, which, in turn, avoids the need to access data in the database 512 on the data storage device.

The "n*(t1+t)+f*n*t2" equation above translates to the following equations:

$$n*(t1+t+f*t2)=>n*(t+f*t2)$$

Multiple-stage evaluation of user-defined predicates improves the amount of time for "n*(t+f*t2)" by improving the time "t" and filter factor "f". In particular, the following formulas are used:

$$t=t\_i+t\_d+t\_r$$

$$f=f\_i*f\_d*f\_r$$

The term "t_i" is the time for looking up index entries. The term "f_i" is the filter factor of the index search. The term "t_d" is the time for the DMS filter evaluation, and the term "f_d" is the corresponding filter factor. The term "t_r" is the time for evaluating the original predicate, and the term "f_r" is the corresponding filter factor. Index exploitation, using the Search module 414 and the Filter module 420, is represented by t_i and f_i, while DMS filtering, using the DMS Filter module 424, is represented by t_d and f_d.

In a conventional system, "t=t_r" and "f=f_r", with the other terms being ignored.

With multiple-stage evaluation of user-defined predicates, the following formula can be transformed as follows:

$$n*(t+f*t2)=n*t+n*f*t2$$

•$n*t=>$ $$n*f\_i*t\_i+n*f\_i*td+n*f\_i*f\_d*t\_r$$

•$n*f*t2=>$ $$n*(f\_i*f\_d*f\_r)*t2$$

The first bullet above indicates that three stages of evaluation are involved. The first stage, represented by n*f_i*t_i, is the index exploitation stage. For index exploitation, after the range of n*f_i records are defined, it takes t_i time to look up each index entry. The second stage, represented by n*f_i*t_d, is the DMS Filter stage. In the DMS Filter stage, processing time is t_d for each record, and there are n*f_i records as input for this stage. After the second stage, only n*f_i*f_d records are considered as candidates. In the third stage, represented by n*f_i*f_d*t_r, the original predicate is evaluated for the qualified records. In particular, n*f_i*f_d records are evaluated, with t_r time spent on processing each record.

The following example provides an illustration of the improved timing offered by multiple-stage evaluation for the following values:

"n"=10000, "t"=1 ms,

"t2"=0.1 ms, "f"=0.01,

"t_i"=0.05 ms, "f_i"=0.04,

"t_d"=0.1 ms, "f d"0.5,

"t_r"=0.85 ms, "f_r"=0.5.

n*t+n*f*t2=10000 ms+10 ms=10010 ms n*(f_i*(t_i+t_d)+f_i*f_d*t_r)+n*(f_i*f_d*f_r)*t2=230 ms+10 ms=240 ms

The magnitude (i.e., the efficiency ratio) is 10010/240, which is 41.7. As indicated by the formulas, the smaller the filter factor "f", the better the magnitude.

Figure 6:
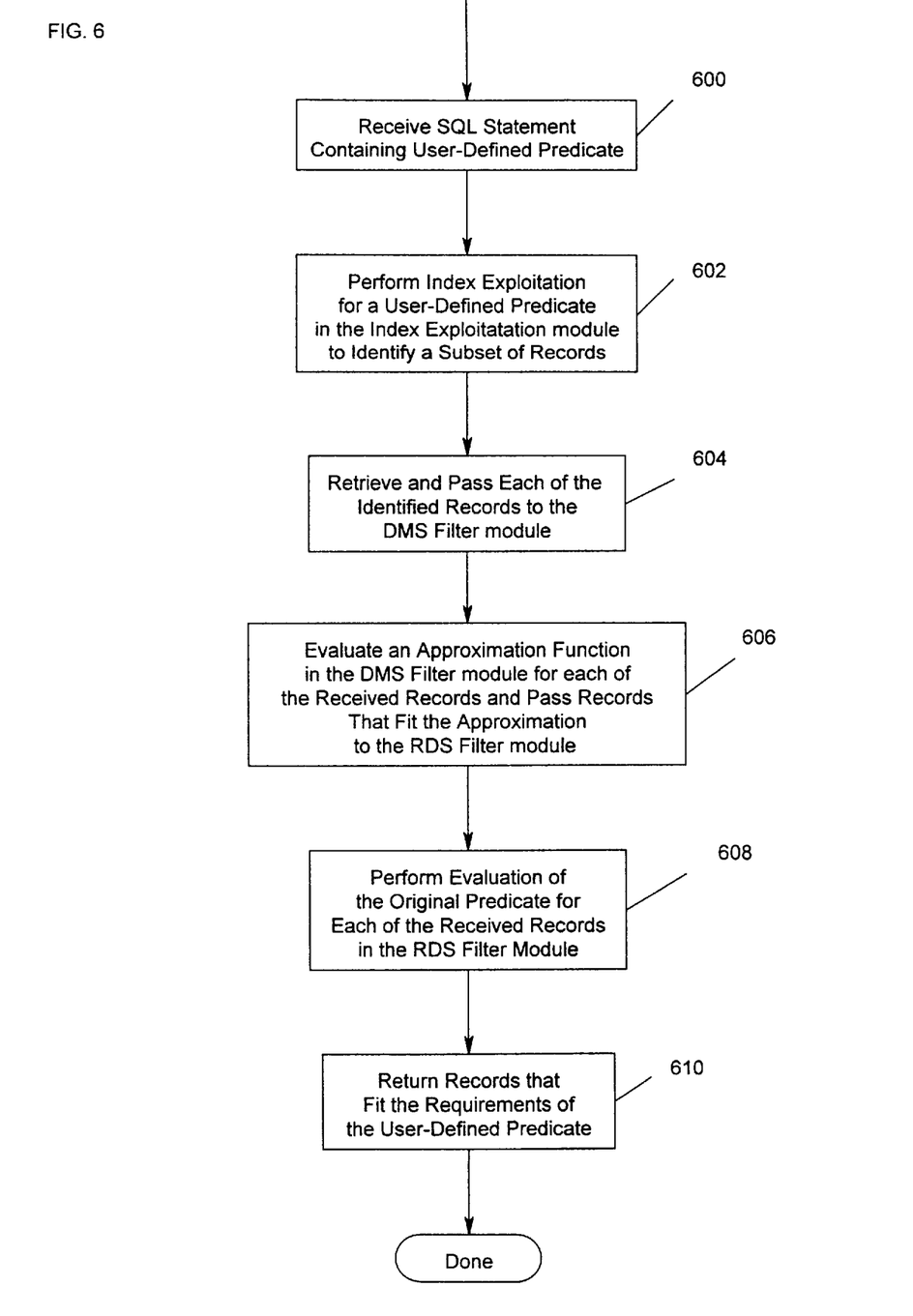
FIG. 6 is a flow diagram illustrating the steps performed at run-time by the multiple-stage evaluation system to perform multiple-stage evaluation of user-defined predicates, after the compiler of the present invention completes parsing.

FIG. 6 is a flow diagram illustrating the steps performed at run-time by the multiple-stage evaluation system to perform multiple-stage evaluation of user-defined predicates, after the compiler 400 of the present invention completes parsing. In Block 600, the multiple-stage evaluation system receives a SQL statement containing a user-defined predicate. In Block 602, the Index Exploitation module 406 of the multiple-stage evaluation system performs index exploitation on a user-defined predicate to identify a subset of records. In Block 604, the multiple-stage evaluation system passes each of the identified subset of records to the DMS Filter module 424. In Block 606, the DMS Filter module 424 of the multiple-stage evaluation system evaluates an approximation function for each of the received records and passes records that fit the approximation to the RDS Filter module 426. In Block 608, the RDS Filter module 426 of the multiple-stage evaluation system performs evaluation of the original user-defined predicate for each of the received records. In Block 610, the multiple-stage evaluation system returns the records that fit the requirements of the user-defined function in response to the received SQL statement.

Conclusion

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

In summary, the present invention discloses a method, apparatus, and article of manufacture for a computer-implemented multiple-stage evaluation of user-defined predicates technique. The present invention enables the use of user-defined predicates in SQL statements. The present invention also provides multiple-stage evaluation of user defined predicates.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of executing a statement in a database stored on a data storage device connected to a computer, the method comprising the steps of:
   receiving the statement, wherein the statement contains a user-defined predicate with a user-defined function; and
   performing multiple-stage evaluation of the user-defined predicate wherein at least one stage comprises performing index exploitation as specified in the user-defined function.

2. The method of claim 1, wherein multiple-stage evaluation comprises multiple stages, further comprising the step of identifying the multiple stages based on a filter factor ratio of each of the multiple stages and a cost factor of evaluation at each of the multiple stages.

3. The method of claim 2, wherein the step of performing multiple-stage evaluation further comprises the step of performing index exploitation to identify a subset of records.

4. The method of claim 3, wherein the index exploitation is performed using a user-defined index exploitation function with a plurality of options.

5. The method of claim 3, wherein the step of performing multiple-stage evaluation further comprises the step of filtering the identified subset of records.

6. The method of claim 5, wherein the step of filtering further comprises the step of evaluating an approximation function for each record in the identified subset of records to identify records that fit an approximation of the approximation function.

7. The method of claim 6, wherein the approximation function is a user-defined function.

8. The method of claim 6, wherein the step of performing multiple-stage evaluation further comprises the step of evaluating the user-defined predicate for each record that fits the approximation.

9. An apparatus for executing a statement, comprising:
   a computer having a data storage device connected thereto, wherein the data storage device stores a database;
   one or more computer programs, performed by the computer, for receiving the statement, wherein the statement contains a user-defined predicate with a user-defined function and performing multiple-stage evaluation of the user-defined predicate, wherein at least one stage comprises performing index exploitation as specified in the user-defined function.

10. The apparatus of claim 9, wherein multiple-stage evaluation comprises multiple stages and further comprising the means for identifying the multiple stages based on a filter factor ratio of each of the multiple stages and a cost factor of evaluation at each of the multiple stages.

11. The apparatus of claim 10, wherein the means for performing multiple-stage evaluation further comprises the means for performing index exploitation to identify a subset of records.

12. The apparatus of claim 11, wherein the index exploitation is performed using a user-defined index exploitation function with a plurality of options.

13. The apparatus of claim 11, wherein the means for performing multiple-stage evaluation further comprises the means for filtering the identified subset of records.

14. The apparatus of claim 13, wherein the means for filtering further comprises the means for evaluating an approximation function for each record in the identified subset of records to identify records that fit an approximation of the approximation function.

15. The apparatus of claim 14, wherein the approximation function is a user-defined function.

16. The apparatus of claim 14, wherein the means for performing multiple-stage evaluation further comprises the means for evaluating the user-defined predicate for each record that fits the approximation.

17. An article of manufacture comprising a computer program carrier readable by a computer and embodying one or more instruction executable by the computer to perform method steps for executing a statement in a database stored in a data storage device connected to the computer, the method comprising the steps of:
   receiving the statement, wherein the statement contains a user-defined predicate with a user-defined function; and
   performing multiple-stage evaluation of the user-defined predicate wherein at least one stage comprises performing index exploitation as specified in the user-defined function.

18. The article of manufacture of claim 17, wherein multiple-stage evaluation comprises multiple stages, further comprising the step of identifying the multiple stages based on a filter factor ratio of each of the multiple stages and a cost factor of evaluation at each of the multiple stages.

19. The article of manufacture of claim 17, wherein the step of performing multiple-stage evaluation further comprises the step of performing index exploitation to identify a subset of records.

20. The article of manufacture of claim 19, wherein the index exploitation is performed using a user-defined index exploitation function with a plurality of options.

21. The article of manufacture of claim 19, wherein the step of performing multiple-stage evaluation further comprises the step of filtering the identified subset of records.

22. The article of manufacture of claim 21, wherein the step of filtering further comprises the step of evaluating an approximation function for each record in the identified subset of records to identify records that fit an approximation of the approximation function.

23. The article of manufacture of claim 22, wherein the approximation function is a user-defined function.

24. The article of manufacture of claim 22, wherein the step of performing multiple-stage evaluation further comprises the step of evaluating the user-defined predicate for each record that fits the approximation.

* * * * *